T. S. MILLER.
SNAP POCKET FOR TRUCK STAKES.
APPLICATION FILED DEC. 7, 1920.

1,398,110.

Patented Nov. 22, 1921.

Tony S. Miller, Inventor

UNITED STATES PATENT OFFICE.

TONY S. MILLER, OF RYDE, CALIFORNIA.

SNAP-POCKET FOR TRUCK-STAKES.

1,398,110.　　　　Specification of Letters Patent.　　Patented Nov. 22, 1921.

Application filed December 7, 1920. Serial No. 428,919.

*To all whom it may concern:*

Be it known that I, TONY S. MILLER, a citizen of the United States of America, residing at Ryde, in the county of Sacramento and State of California, have invented new and useful Improvements in Snap-Pockets for Truck-Stakes, of which the following is a specification.

The object of the invention is to provide a simple and efficient means for use in connection with or supplemental to the ordinary or main stake pockets, of trucks and similar vehicles having provision for use for removable stakes, to lock the stakes in their engaging relation with the pockets and prevent the vibration and dismounting thereof, and incidentally to provide means whereby the retaining means may be secured against vibration when not in use as a stake securing means; and with these objects in view the invention consists in a construction and combination of parts of which a preferred embodiment is shown in the drawing, wherein:—

Figure 1:
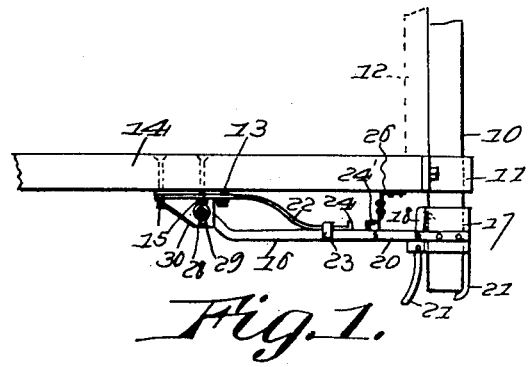
Figure 1 is a side view of the snap pocket or stake holder arranged in operative relation with a truck and in engagement with a stake mounted in a pocket of conventional form.
Figure 2:
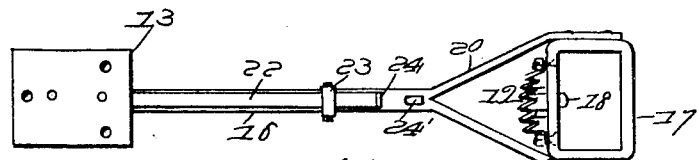
Fig. 2 is a plan view of the same.
Figure 3:
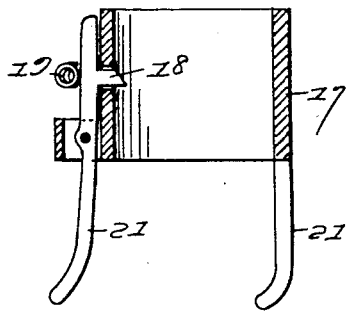
Fig. 3 is a sectional view of the stake engaging band.
Figure 4:
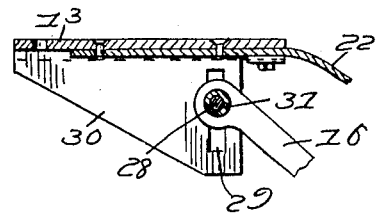
Fig. 4 is a detail view of the base by which the device is secured to the floor of a truck.
Figure 5:
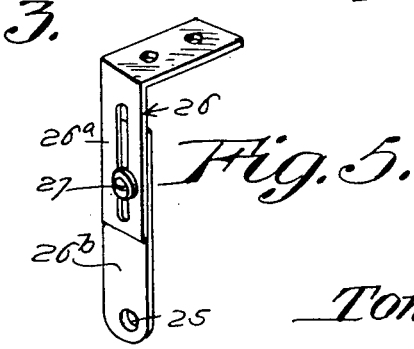
Fig. 5 is a perspective view of the extensible hanger for supporting the stake holder in an elevated position when not in use.

It will be understood that the device embodying the invention is adapted for securing stakes 10 in proper operative engagement with pockets 11 of the ordinary or any approved form, whether such stakes are used independently or support side boards indicated in dotted lines at 12, and in the construction illustrated the device embodies essentially a base plate 13 adapted to be attached to the under surface of a truck floor 14 as by means of bolts 15, and an arm 16 pivotally mounted upon said base plate and provided at its free end with a sleeve or collar 17 for receiving and engaging the lower end of the stake seated in said pocket, said sleeve or collar preferably carrying a clamp or locking means consisting for example of a pawl 18 actuated by a spring 19 and having a beveled upper side to facilitate the downward movement of the stake therethrough while preventing upward displacement except by withdrawing the said pawl from its engaging relation with the stake.

The arm 16 is preferably forked or bifurcated at 20 with the extremities thereof permanently secured to the collar or sleeve, and depending from the latter are grip rods 21, one of which is secured to the collar or sleeve while the other forms an extension of the pawl, whereby upon grasping said rods the pawl may be readily displaced or disengaged from the stake to release the same and permit of the withdrawal thereof from the collar or sleeve and also from the pocket.

Also in connection with the arm 16 there is preferably employed a spring 22 exerting a downward pressure upon the arm and operating in its free end in a keeper 23 with a terminal ear 24 forming a stop which limits the downward swinging movement of the free end of the arm.

In use, the collar or sleeve having been fitted and locked upon the lower end of the stake, the weight thereof supplemented by the said spring serves to hold the stake firmly in its seat in the pocket while permitting a limited vertical vibratory movement; and when the retaining or holding device is not in use it may be supported in an elevated position by the engagement of a hook 24' near the outer end of the arm with an opening 25 in the lower end of the hanger 26 depending from the truck floor, said hanger consisting of an extensible arm having relatively adjustable members 26ª and 26ᵇ, one of which is slotted for engagement by a set screw 27.

Also in order to provide for vertical adjustment of the pivotal inner end of the arm 16, a bolt 28 is extended through registering slots 29 in the depending ears 30 projecting from the base plate. A sleeve 31 on the pivot bolt extending through the inner end of the arm and terminally arranged in contact with the inner surfaces of the depending ears serves to permit the pivotal movement of the arms 16 while adapting the bolt to be adjusted so as to lock it and hence secure the fulcrum of said arm in an adjusted position.

It will be understood that a device of the type indicated can readily be applied to a truck for use in connection with the main stake holders or pockets for engagement with the lower extremities of the stakes when seated in said ordinary holders or pockets to effectually provide against the objectionable vibration of the stakes or the displacements thereof from the holders or pockets by reason of the jolting or jarring of the truck when in movement, said supplemental holding means being adapted to be secured in fixed relation to the truck body when not in use.

Having described the invention, what is claimed as new and useful is:—

1. The combination with a truck having a stake holder pocket, of a supplemental holder disposed below said main holder and having means for locking engagement with a stake seated in the main holder, the supplemental holder being yieldable in the direction of the main holder.

2. The combination with a truck having a stake holder pocket, of a supplemental holder disposed below said main holder and having means for locking engagement with a stake seated in the main holder, the supplemental holder being movable in the direction of the length of the stake and yieldingly impelled in the direction away from the main holder.

3. A stake holder for trucks having a pivotal vertically movable spring depressed arm provided at its free end with means for engaging the lower end of a stake below the main stake holder or pocket.

4. A stake holder for trucks having a pivotal arm mounted for swinging movement in a vertical plane, provided at its inner end with a base plate for attachment to a truck floor and having at its outer end a stake receiving collar or sleeve provided with a stake engaging pawl.

5. A stake holder for trucks having a pivotal arm mounted for swinging movement in a vertical plane, provided at its inner end with a base plate for attachment to a truck floor and having at its outer end a stake receiving collar or sleeve provided with a stake engaging pawl and grip rods depending from the collar or sleeve, one of them being connected with the pawl.

6. A stake holder for trucks having a base plate, a vertically swinging arm pivotally mounted at one end upon said base plate and provided at the other end with a stake engaging clamp and means for securing the free end of the arm in a fixed relation to the truck body, said means consisting of a hanger attachable to the truck body, and a hook on the arm for engaging the hanger.

7. A stake holder for trucks having a base plate, a vertically swinging arm pivotally mounted at one end upon said base plate and provided at the other end with a stake engaging clamp and means for securing the free end of the arm in a fixed relation to the truck body, said means consisting of an extensible hanger provided with means for attachment to a truck body and having relatively adjustable members and a set screw for securing said members in their adjusted relations, and a hook carried by said arm for engagement with an opening in the hanger.

8. A stake holder for trucks having a base plate for attachment to a truck floor and provided with depending slotted ears, an arm having a terminal pivot bolt for adjustable engagement with the slots of said ears, and a pawl carrying collar or sleeve carried by the free end of said arm for engaging the lower end of a stake.

In testimony whereof I affix my signature.

TONY S. MILLER.